US010277551B2

(12) United States Patent
Fox et al.

(10) Patent No.: US 10,277,551 B2
(45) Date of Patent: Apr. 30, 2019

(54) METHODS AND SYSTEMS FOR PROVIDING CURRENT EMAIL ADDRESSES AND CONTACT INFORMATION FOR MEMBERS WITHIN A SOCIAL NETWORK

(71) Applicant: Google Inc., Mountain View, CA (US)

(72) Inventors: Kevin David Fox, Sunnyvale, CA (US); Duane Scott Hess, Mountain View, CA (US)

(73) Assignee: Google LLC, Mountain View, CA (US)

(*) Notice: Subject to any disclaimer, the term of this patent is extended or adjusted under 35 U.S.C. 154(b) by 685 days.

(21) Appl. No.: 14/835,551

(22) Filed: Aug. 25, 2015

(65) Prior Publication Data
US 2016/0057095 A1 Feb. 25, 2016

Related U.S. Application Data

(63) Continuation of application No. 13/618,194, filed on Sep. 14, 2012, now Pat. No. 9,117,181, which is a (Continued)

(51) Int. Cl.
*H04L 12/58* (2006.01)
*G06Q 10/00* (2012.01)
(Continued)

(52) U.S. Cl.
CPC .............. *H04L 51/32* (2013.01); *G06Q 10/00* (2013.01); *H04L 29/1215* (2013.01);
(Continued)

(58) Field of Classification Search
CPC ...................................................... H04L 51/32
See application file for complete search history.

(56) References Cited

U.S. PATENT DOCUMENTS 5,287,498 A   2/1994 Perelman et al.
5,537,586 A   7/1996 Amran et al.
(Continued)

FOREIGN PATENT DOCUMENTS

CN   1949220   4/2007
EP   1288795   3/2003
(Continued)

OTHER PUBLICATIONS

"Mufin.com: content-based recommendations," Net, Blogs and Rock'n'Roll, [online] [Retrieved on May 13, 2009] Retrieved from the internet <URL: http://www.netblogsrocknroll.com/2008/10/mufin-music-fin.html>, Oct. 8, 2008, 6 pgs.
(Continued)

*Primary Examiner* — Suraj M Joshi
(74) *Attorney, Agent, or Firm* — Patent Law Works LLP

(57) ABSTRACT

Methods and systems for providing current email addresses or contact information to members within a social network are described. In one described method, an email program application requests an email address for a member within a social network. Using profile information associated with the member, the email address is provided to the email program application which sent the request. The email address is then entered into the send-to parameter field of an email message. In another described method, contact information associated with a first member of a social can be provided to a second member of the social network. The contact information is provided if the relationship between the first and second members is an authorized relationship. The contact information associated with the first member can be used to update the contact information for the first member in an electronic address book associated with the second member.

20 Claims, 4 Drawing Sheets

Related U.S. Application Data continuation of application No. 11/095,337, filed on Mar. 30, 2005, now Pat. No. 8,412,780.

(51) Int. Cl.
*H04L 29/12* (2006.01)
*H04L 29/08* (2006.01)

(52) U.S. Cl.
CPC .......... *H04L 51/28* (2013.01); *H04L 61/1564* (2013.01); *H04L 61/1594* (2013.01); *H04L 67/306* (2013.01); *H04L 29/12084* (2013.01); *H04L 61/1523* (2013.01)

(56) References Cited

U.S. PATENT DOCUMENTS

| | | |
|---|---|---|
| 5,796,393 A | 8/1998 | MacNaughton et al. |
| 5,809,297 A | 9/1998 | Kroenke et al. |
| 5,950,200 A | 9/1999 | Sudai et al. |
| 5,963,951 A | 10/1999 | Collins |
| 5,978,673 A | 11/1999 | Alperovich |
| 6,041,311 A | 3/2000 | Chislenko et al. |
| 6,052,122 A | 4/2000 | Sutcliffe et al. |
| 6,061,681 A | 5/2000 | Collins |
| 6,073,105 A | 6/2000 | Sutcliffe et al. |
| 6,073,138 A | 6/2000 | de l'Etraz et al. |
| 6,073,141 A | 6/2000 | Salazar |
| 6,091,948 A | 7/2000 | Carr et al. |
| 6,092,049 A | 7/2000 | Chislenko et al. |
| 6,130,938 A | 10/2000 | Erb |
| 6,192,119 B1 | 2/2001 | Wilson |
| 6,256,648 B1 | 7/2001 | Hill et al. |
| 6,327,590 B1 | 12/2001 | Chidlovskii et al. |
| 6,366,962 B1 | 4/2002 | Teibel |
| 6,389,372 B1 | 5/2002 | Glance et al. |
| 6,421,678 B2 | 7/2002 | Smiga et al. |
| 6,442,567 B1 | 8/2002 | Retallick et al. |
| 6,594,673 B1 | 7/2003 | Smith et al. |
| 6,658,423 B1 | 12/2003 | Pugh et al. |
| 6,665,715 B1 | 12/2003 | Houri |
| 6,678,681 B1 | 1/2004 | Brin |
| 6,697,478 B1 | 2/2004 | Meldrum et al. |
| 6,754,322 B1 | 6/2004 | Bushnell |
| 6,782,425 B1 | 8/2004 | Germscheid et al. |
| 6,799,176 B1 | 9/2004 | Page |
| 6,834,195 B2 | 12/2004 | Brandenberg et al. |
| 6,837,436 B2 | 1/2005 | Swartz et al. |
| 6,865,546 B1 | 3/2005 | Song |
| 6,867,733 B2 | 3/2005 | Sandhu et al. |
| 6,871,186 B1 | 3/2005 | Tuzhilin et al. |
| 6,912,505 B2 | 6/2005 | Linden et al. |
| 7,013,292 B1 | 3/2006 | Hsu et al. |
| 7,069,308 B2 | 6/2006 | Abrams |
| 7,080,117 B2 | 7/2006 | De Pinto et al. |
| 7,092,821 B2 | 8/2006 | Mizrahi et al. |
| 7,106,848 B1 | 9/2006 | Barlow et al. |
| 7,113,917 B2 | 9/2006 | Jacobi et al. |
| 7,117,254 B2 | 10/2006 | Lunt et al. |
| 7,155,608 B1 | 12/2006 | Malik et al. |
| 7,177,904 B1 | 2/2007 | Mathur et al. |
| 7,188,153 B2 | 3/2007 | Lunt |
| 7,225,249 B1 | 5/2007 | Barry et al. |
| 7,269,590 B2 | 9/2007 | Hull |
| 7,356,490 B1 | 4/2008 | Jacobi et al. |
| 7,366,990 B2 | 4/2008 | Pitroda |
| 7,383,258 B2 | 6/2008 | Harik et al. |
| 7,395,075 B2 | 7/2008 | Posner et al. |
| 7,418,268 B1 | 8/2008 | Cabano et al. |
| 7,433,832 B1 | 10/2008 | Bezos et al. |
| 7,433,876 B2 | 10/2008 | Spivack et al. |
| 7,440,746 B1 | 10/2008 | Swan |
| 7,478,078 B2 | 1/2009 | Lunt |
| 7,555,110 B2 | 6/2009 | Dolan et al. |
| 7,610,287 B1 | 10/2009 | Dean et al. |
| 7,742,468 B2 | 6/2010 | Vagelos |
| 7,808,980 B2 | 10/2010 | Skakkebaek et al. |
| 7,907,903 B2 | 3/2011 | Shen et al. |
| 8,412,780 B2 | 4/2013 | Fox et al. |
| 2001/0011247 A1 | 8/2001 | O'Flaherty et al. |
| 2002/0023230 A1 | 2/2002 | Bolnick et al. |
| 2002/0059130 A1 | 5/2002 | Cheng et al. |
| 2002/0059201 A1 | 5/2002 | Work |
| 2002/0103682 A1 | 8/2002 | Stemmer |
| 2002/0124053 A1 | 9/2002 | Adams et al. |
| 2002/0137490 A1 | 9/2002 | Gallant |
| 2002/0143874 A1 | 10/2002 | Marquette et al. |
| 2002/0169835 A1 | 11/2002 | Paul, Jr. et al. |
| 2002/0174073 A1 | 11/2002 | Nordman et al. |
| 2003/0020977 A1 | 1/2003 | Smith et al. |
| 2003/0063072 A1 | 4/2003 | Brandenberg et al. |
| 2003/0069749 A1 | 4/2003 | Shear et al. |
| 2003/0083898 A1 | 5/2003 | Wick |
| 2003/0101227 A1 | 5/2003 | Fink |
| 2003/0217151 A1 | 11/2003 | Roese et al. |
| 2004/0093224 A1 | 5/2004 | Vanska |
| 2004/0093317 A1* | 5/2004 | Swan ................ H04M 3/42365 |
| 2004/0122681 A1 | 6/2004 | Ruvolo et al. |
| 2004/0122803 A1 | 6/2004 | Dom et al. |
| 2004/0148275 A1 | 7/2004 | Achlioptas |
| 2004/0153512 A1 | 8/2004 | Friend |
| 2004/0162830 A1 | 8/2004 | Shirwadkar |
| 2004/0172378 A1 | 9/2004 | Shanahan |
| 2004/0193684 A1 | 9/2004 | Ben-Yoseph |
| 2004/0215793 A1 | 10/2004 | Ryan et al. |
| 2004/0249811 A1 | 12/2004 | Shostack |
| 2004/0258220 A1 | 12/2004 | Levine et al. |
| 2004/0260781 A1 | 12/2004 | Shostack et al. |
| 2005/0015432 A1 | 1/2005 | Cohen |
| 2005/0015457 A1 | 1/2005 | Warasawa |
| 2005/0021750 A1 | 1/2005 | Abrams |
| 2005/0050158 A1 | 3/2005 | Solari |
| 2005/0071741 A1 | 3/2005 | Acharya et al. |
| 2005/0105697 A1 | 5/2005 | Hollowell et al. |
| 2005/0120084 A1 | 6/2005 | Hu et al. |
| 2005/0152521 A1 | 7/2005 | Liljestrand |
| 2005/0159970 A1 | 7/2005 | Buyukkokten et al. |
| 2005/0165785 A1 | 7/2005 | Malkin et al. |
| 2005/0171832 A1 | 8/2005 | Hull et al. |
| 2005/0171954 A1 | 8/2005 | Hull et al. |
| 2005/0177385 A1 | 8/2005 | Hull et al. |
| 2005/0177599 A1 | 8/2005 | Goodman |
| 2005/0193054 A1 | 9/2005 | Wilson et al. |
| 2005/0198031 A1 | 9/2005 | Pezaris et al. |
| 2005/0209999 A1 | 9/2005 | Jou |
| 2005/0210409 A1 | 9/2005 | Jou |
| 2005/0216300 A1 | 9/2005 | Appelman et al. |
| 2005/0216550 A1 | 9/2005 | Paseman et al. |
| 2005/0246420 A1 | 11/2005 | Little |
| 2005/0267766 A1 | 12/2005 | Galbreath et al. |
| 2005/0267940 A1 | 12/2005 | Galbreath et al. |
| 2006/0026288 A1 | 2/2006 | Acharya et al. |
| 2006/0077957 A1 | 4/2006 | Reddy et al. |
| 2006/0136419 A1 | 6/2006 | Brydon et al. |
| 2006/0184997 A1 | 8/2006 | LaRotonda et al. |
| 2006/0206604 A1 | 9/2006 | O'Neil et al. |
| 2007/0127631 A1 | 6/2007 | Difiglia |
| 2007/0171898 A1 | 7/2007 | Salva |
| 2007/0173236 A1 | 7/2007 | Vishwanathan et al. |
| 2007/0233736 A1 | 10/2007 | Xiong |
| 2007/0248077 A1 | 10/2007 | Mahle, Jr. et al. |
| 2008/0004941 A1 | 1/2008 | Calabria |
| 2008/0153480 A1 | 1/2008 | Jiang |
| 2008/0056475 A1 | 3/2008 | Brannick et al. |
| 2008/0133716 A1 | 6/2008 | Rao et al. |
| 2008/0192656 A1 | 8/2008 | Vagelos |
| 2009/0005070 A1 | 1/2009 | Forstall et al. |
| 2009/0013386 A1 | 1/2009 | Puthenkulam et al. |
| 2009/0082001 A1 | 3/2009 | Rahul et al. |
| 2009/0131026 A1 | 5/2009 | Allen et al. |
| 2010/0128857 A1 | 5/2010 | Logan |
| 2010/0130228 A1 | 5/2010 | Vendrow et al. |
| 2010/0279673 A1 | 11/2010 | Sharp et al. |
| 2011/0059732 A1 | 3/2011 | Cai et al. |

(56) References Cited

U.S. PATENT DOCUMENTS

| | | |
|---|---|---|
| 2011/0098156 A1 | 4/2011 | Ng et al. |
| 2011/0112768 A1 | 5/2011 | Doyle |
| 2011/0209221 A1 | 8/2011 | Hanson et al. |

FOREIGN PATENT DOCUMENTS

| | | | |
|---|---|---|---|
| JP | 11265369 | 9/1999 | |
| WO | WO0068860 | 11/2000 | |
| WO | WO01124551 | 4/2001 | |
| WO | WO0279984 | 10/2002 | |
| WO | WO05015470 | 2/2005 | |
| WO | WO 2005015470 A1 * | 2/2005 | ............ G06Q 10/10 |
| WO | WO-2005054982 A2 * | 6/2005 | ............ G06Q 30/02 |

OTHER PUBLICATIONS

Multiply, "About Multiply," web page at http://multiply.com/info/about, as available via the Internet and printed May 3, 2004, 2 pgs.

Multiply, "Help," web page at http://multiply.comlnfo/help, as available via the Internet and printed May 3, 2004, 2 pgs.

Multiply, "Multiply Privacy Policy," web page at http://multiply.com/info/privacy, as available via the Internet and printed on May 3, 2004, 4 pgs.

Multiply, "Multiply Terms of Service," web page at http://multiply.com/info/tos, as available via the Internet and printed on printed May 3, 2004, 6 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

NomadNet, "Nomad Net News," web page at http://www.netnomad.com/, as available via the Internet and printed Dec. 1, 2004, 12 pgs.

Office Action for Canada Patent Application No. 2,603,364, dated Jan. 5, 2010, 6 pgs.

Office Action for Canada Patent Application No. 2,603,364, dated Aug. 3, 2010, 9 pgs.

O'Murchu et al., "Online Social and Business Networking Communities," Digital Enterprise Research Institute DERI Technical Report, National University of Ireland, Aug. 11, 2004, 22 pgs.

Online Business Network, "Social Networking Site Guide—Ryze," web page at http://www.onlinebusinessnetworks.com/online-social-networks-guide/ryzEtQbp, as available via the Internet and printed Dec. 1, 2004, 8 pgs.

PC World, "PCWorld—ICQ Builds a Social Network," web page at http://www.gcworld.com/news/article/O,aid,115084,OO.asg, as available via the Internet and printed Dec. 1, 2004, 5 pgs.

"PlanetAll," From Internet Archive Wayback Machine on Nov. 1997, [online] [Retrieved on Mar. 17, 2004] Retrieved from the internet <URL: Internet Archive Wayback Machine: www.archive.org/www/planetall.com>, 19 pgs.

"Recommender system," Wikipedia, Last modified Jul. 27, 2009, [online] [Retrieved on Aug. 6, 2009] Retrieved from the internet <URL:http://en.wikipedia.org/wiki/Recommendation_system>, 5 pgs.

Resnick, P., et al., "Recommender Systems," Communications of the ACM, Mar. 1997, pp. 56-58, vol. 40, No. 3.

Ring Central, Inc., Internet, retrieved at http://www.ringcentral.com, Apr. 19, 2007, 1 pg.

Rucker, J., et al., "Personalized Navigation for the Web," Communications of the ACM, Mar. 1997, pp. 73-75, vol. 40, No. 3.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Sullivan, Danny, "Is It Really Personalized Search?" http://searchengine watch.com, printed May 13, 2004.

Superfeedr Track, Internet, retrieved at http://blog.superfeedr.com/track/filter/xmpp/pubsubhubbub/track, May 13, 2011, 8 pgs.

Tan, P.-N., et al., "Introduction to Data Mining," Chapter 8 Cluster Analysis: Basic Concepts and Algorithms (Section 8.3.3—The Lance-Williams Formula for Cluster Proximity, p. 524), 2006, pp. 487-568.

Target, "Targetcom Wish List," 2 pgs, [online] [Retrieved on Aug. 4, 2004] Retrieved from the internet <URL: http://www.target.com/gp/registry.html/ref=nav_t_gc/601-1917759 0687329?%5Fencoding=UTF8&type=wishlist>.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

Wilson, S., "Auto complete comes to age," [online][retrieved on Jan. 27, 2011] Retrieved from the Internet <URL: http://blogs.sitepoint.com12004/12/10auto-complete-comes-of-age/>, Dec. 10, 2004, 1 pg.

Yahoo!, "Yahoo! Chat," web page at http://chat.yahoo.com/, as available via the Internet and printed Dec. 1, 2004, 1 pg.

Yahoo! Groups, "Customize LostDrive-In," web page at <URL:http://groups.yahoo.com/groups/lostdrive-in/confwiz>, as available via the Internet and printed Jun. 2, 2004, 10 pages.

Yahoo! Inc., "Yahoo! Groups," Yahoo! Inc., [online] [retrieved on Jul. 29, 2004] retrieved from the internet <URL:http://groups.yahoo.com>, 2 pgs.

Yahoo! Inc., "Yahoo! Help—Groups," Yahoo! Inc., [online] [retrieved on Jul. 29, 2004] retrieved from the internet <URL: http://help.yahoo.com/help/us/groups/groups-01.html>, 12 pgs.

Yahoo!, "Yahoo! Help—Yahoo! GeoCities Tour," web page at http://help.yahoo.com/help/us/geo/tour/tour-01.html, as available via the Internet and printed Dec. 1, 2004, 20 pgs.

Yahoo! Inc., "Yahoo! Help—Groups Database," Yahoo! Inc., [online] [retrieved on Jul. 29, 2004] retrieved from the Internet <URL:http://help.yahoo.com/help/us/groups/database>, 9 pgs.

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

"Autocomplete Comes of Age," http://blogs.sitepoint.com/2004/12/10/auto-complete-comes-of-age/, Dec. 10, 2004 1 page.

"Autocomplete", Hooperbloob, Wikipedia, [online] [retrieved on Jan. 27, 2011] Retrieved from the Internet <URL: http://en.wikipedia.org/w/index.pho?title=Autocomplet&oldid=14177197>, Mar. 6, 2005, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Balabanovic, M., et al., "Content-Based, Collaborative Recommendation," Mar. 1997, pp. 66-72, vol. 40, No. 3.

Boyd et al., "Social Network Sites: Definition, History, and Scholarship," Journal of Computer-Mediated Communication, International Communication Association, 2008, pp. 210-230.

(56) References Cited

OTHER PUBLICATIONS

Choi, J., "Netflix Prize for the best collaborative filtering algorithm," Data mining and parallelization, CGL Blog, [online] [Retrieved on May 13, 2009] Retrieved from the internet <URL: http://jychoi-report-cgl.blogspot.com/2008/07/netflix-prize-for-best-collaborative.html>, Jul. 16, 2008, 3 pgs.
Churchill et al., "Social Networks and Social Networking," IEEE Computer Society, Sep.-Oct. 2005, pp. 14-19.
"CodeFx: PHP: Introduction to AJAX," NexusFX, [online][retrieved on Jan. 27, 2011] Retrieved from the Internet <URL:http://www.nexusfx.net/articles/php/introduction_to_ajax>, Jul. 26, 2004, 1 pg.
Cohen et al., "Social Networks for Creative Collaboration," C&C'05, Apr. 12-15, 2005, London, United Kingdom, pp. 252-255.
"Collaborative filtering," Wikipedia, Last modified Oct. 17, 2007, [online] [Retrieved on May 13, 2009] Retrieved from the internet <URL:http://web.archive.org/web/20071020061658/http:/en.wikipedia.org/wiki/Collaborative_filtering>, 10 pgs.
Decker et al., "The Social Semantic Desktop," Digital Enterprise Research Institute, DERI Galway, Ireland, DERI Innsbruck, Austria, DERI Technical Report, May 2, 2004, 7 pgs.
Doctorow, "Running Notes From Revenge of the User: Lessons from Creator/User Battles," web page at http://craphound.com/danahetcon04.txt, as available via the Internet and printed Jul. 28, 2004, 5 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Espacenet Reference EP 1288795, Mar. 5, 2003, 1 page.
European Search Report for European Patent Application EP 06738600, dated May 3, 2010, 6 pgs.
European Search Report (Supplementary) for European Patent Application EP 06738600, dated Feb. 8, 2011, 6 pgs.
Felicite.com, Wedding Registry & Gift Registry, Internet Archive Wayback Machine archived on May 30, 2003 , 17 pgs, [online] [Retrieved on Feb. 2, 2007] Retrieved from the internet <URL:http://web.archive.org/web/20030530051929lhttp://www.feliGite.com> . . . .
Garrett, J., "Ajax: A New Approach to Web Applications," Adaptive Path, [online] [retrieved on Apr. 26, 2007] Retrieved from the Internet <URL:http://www.adaptivepath.com/publications/essays/archives/000385.php>, Feb. 18, 2005, 5 pgs.
Glance, N., et al., "Knowledge Pump: Supporting the Flow and Use of Knowledge," Information Technology for Knowledge Management, 1998, 22 pgs.
Google, Inc., "Google Answers," Google, 2004, 1 page, [online] [retrieved on Jul. 29, 2004] retrieved from the internet <URL:http://answers.google.com/answers/>.
Google, Inc., "Google Answers: Frequently Asked Questions," Google, 2003, 9 pgs, [online] [retrieved on Jul. 29, 2004] retrieved from the internet <URL:http://answers.google.com/answers/faq.html>.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
India First Examination Report for India Patent Application No. 1742/MUMNP/2007, dated Nov. 10, 2010, 2 pgs.
International Search Report, International Application No. PCT/US2006/009562, dated Jun. 17, 2008, 8 pgs.
International Search Report, International Application No. PCT/US2008005118, dated Sep. 30, 2008, 2 pgs.
Jensen, C., et al., "Finding Others Online: Reputation Systems for Social Online Spaces," Group Spaces, CHI 2002, Apr. 20-25, 2002, pp. 447-454, vol. 4, Iss. 1.
Justus, C., "Google Suggest Dissected", Server Side Guy Blog Spot, [online] [retrieved on Jan. 27, 2011] Retrieved from the Internet <URL:http://serversideguy.blogspot.com/2004/12/google-suggestdissected.html>, Dec. 14, 2004, 27 pgs.
Kautz, H., et al., "ReferralWeb: Combining Social Networks and Collaborative Filtering," Communications of the ACM, Mar. 1997, 4 pgs, vol. 40, No. 3.
Lance, G.N., et al, "Computer programs for hierarchical polythetic classification ("similarity analyses")," The Computer Journal, C.S.I.R.O. Computing Research Section, 1966, p. 60-64, vol. 9.
Lance, G.N., et al., "A Generalized Sorting Strategy for Computer Classifications," Nature, Oct. 8, 1966 p. 218, vol. 212.
Lance, G.N., et al., "A General Theory of Classificatory Sorting Strategies 1. Hierarchical Systems," The Computer Journal, C.S.I.R.O. Computing Research Section, 1967, pp. 373-380, vol. 9, No. 4.
Lance, G.N., et al., "Mixed-data classificatory programs. I. Agglomerative Systems," Austral. Comput. J., 1968, pp. 15-20, vol. 1.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Lueg, C., "Considering Collaborative Filtering as Groupware: Experiences and Lessons Learned," Proceedings of the Second International Conference of Practical Aspects of Knowledge Management, 1998, pp. 16-1-16-6.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Milligan, G., "Ultrametric Hierarchical Clustering Algorithms," Psychometrika, Sep. 1979, pp. 343-346, vol. 44, No. 3.
Mori et al., "Real-world Oriented Information Sharing Using Social Networks," Group '05, Sanibel Island, Florida, USA, Nov. 6-9, 2005, pp. 81-84.
Office Action for BR Application No. PI0609527-5, dated Jan. 24, 2018, 4 pgs.

\* cited by examiner

METHODS AND SYSTEMS FOR PROVIDING CURRENT EMAIL ADDRESSES AND CONTACT INFORMATION FOR MEMBERS WITHIN A SOCIAL NETWORK

CROSS REFERENCE TO RELATED APPLICATIONS

This application is a continuation of and claims priority to U.S. application Ser. No. 13/618,194, filed Sep. 14, 2012, titled "Methods and Systems for Providing Current Email Addresses and Contact Information for Members within a Social Network" which is a continuation of and claims priority to U.S. application Ser. No. 11/095,337, filed Mar. 30, 2005, titled "Methods and Systems for Providing Current Email Addresses and Contact Information for Members within a Social Network," each of which is incorporated by reference in its entirety.

FIELD OF THE INVENTION

The invention generally relates to social networks. More particularly, the invention relates to methods and systems for providing current email addresses and contact information for members within a social network.

BACKGROUND

Conventional web email systems such as those hosted on Yahoo!™, Hotmail™ or other web sites, facilitate communication between people. These conventional websites generally do not provide a central repository for maintaining current email addresses for members within a social network. Similarly, conventional email client systems such as Outlook™ encounter similar problems in that the email addresses stored in a user's address book or contact list are not always current. In addition to email addresses, electronic address books typically do not maintain current contact information.

Typically, a user must physically enter contact information for each contact in a user's address book or contact list. Recently, V-cards have helped in reducing the actual typing required to enter a new contact into a user's address book or contact list. Unfortunately, contact information including email addresses is not static, thus a user must update his or her address book or contact list whenever a contact changes his or her contact information. However, in order to maintain current contact information, the user must be aware of the changes.

SUMMARY

Embodiments of the present invention comprise systems and methods for providing current email addresses and contact information for members of a social network. One aspect of an embodiment of the present invention comprises receiving a request for an email address of a first member of a social network, the request comprising an entity identifier associated with the first member; determining an email address for the first member using profile information associated with the first member, returning the email address in response to the request; and inserting the email address into a sending parameter of an email message.

Another exemplary method of one embodiment of the present invention comprises receiving a request for contact information associated with a first member of a social network, the request comprising a first entity identifier associated with the first member and a second entity identifier associated with the requester of the contact information, determining if the requester is authorized to receive the contact information using profile information associated with the first member, sending the contact information to the requester if authorized, comparing the sent contact information with the contact information for the first member in an address book associated with the requester, and replacing differing contact information associated with the first member in the address book with the corresponding sent contact information.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects and advantages of the present invention are better understood when the following Detailed Description is read with reference to the accompanying drawings, wherein.

DETAILED DESCRIPTION

Introduction

Figure 1:
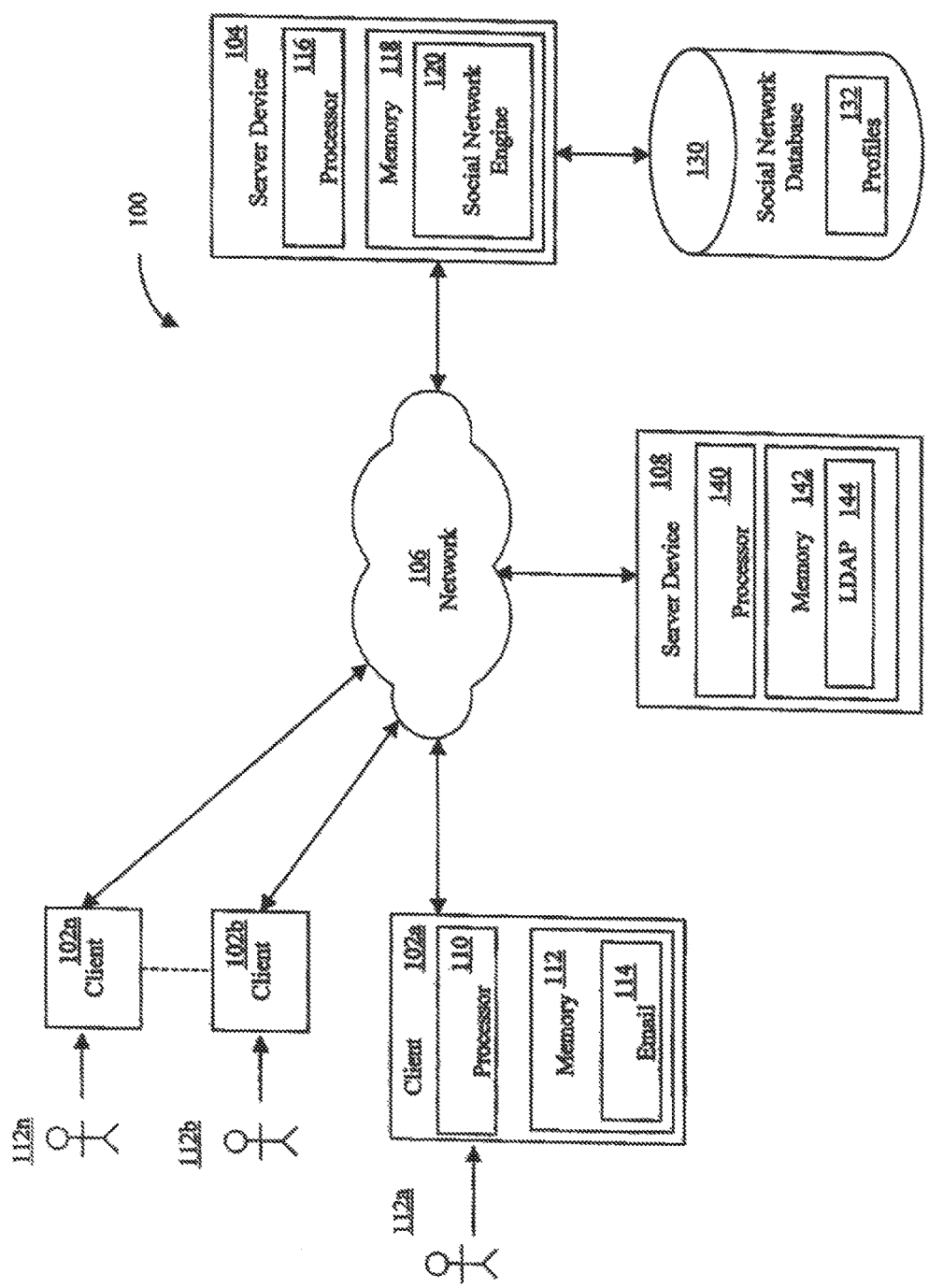
FIG. 1 illustrates a block diagram of an exemplary system in accordance with an embodiment of the present invention.

Embodiments of the present invention comprise systems and methods for providing current email addresses and contact information for members within a social network. A social network can refer to a computer network connecting people or organizations by a set of social relationships, such as friendship, co-working, or information exchange. Examples of a social network can include Orkut™, Friendster™, and Tribe™. In one embodiment, using an email program application on a client device or an email program application accessible via a browser program application on a client device, e.g., a laptop computer, a user can enter an entity identifier into the sending parameter of an email message. The entity identifier attempts to identify an intended recipient of the email message, e.g., a member of a social network. Entering the entity identifier triggers the email program application to send a request for an email address to a directory application. The directory application receives the request and parses out the entity identifier from the request. The directory application uses the entity identifier to identify a member of the social network. If there are multiple members identified with the entity identifier, the directory application can prompt the user to select the appropriate member. For example, if the user entered "smith" as the intended recipient of the email message, the directory application can prompt the user to select the proper "smith," e.g., "John Smith, Frank Smith, Robert Smith?" Once the member is identified, the directory application obtains the email address from the user profile associated with identified member. The directory application then outputs the email address to the email program application associated with the user who caused the request for email address to be sent. The email message is then sent to the email address provided by the directory application. Thus, a member of the social network can maintain his or her current email address in his or her user profile. By maintaining a current email address in the user profile, a member can ensure that he or she receives email messages regardless of whether the sender has the member's current address.

In another embodiment, current contact information for a member of a social network can be provided to a user who requests such information. For example, using an email program application on a client device or an email program application accessible via a browser program application on a client device, e.g., a laptop computer, a user can trigger the sending of a request for the contact information of a member of a social network. For example, by clicking on the member's name in the address directory, the email program application can request the contact information for the member of a social network. The request can comprise a second entity identifier identifying the requester of the contact information and a first entity identifier identifying the contact, e.g., a member in a social network. The request is sent to a directory application which identifies the requester and the contact. Using the user profile associated with the contact, the directory application determines the relationship between the requester and the contact and determines if such a relationship permits the contact information associated with the contact to be released. For example, if the user profile associated with the contact indicates that all friends and business acquaintances can receive his or her contact information and if the requester and the contact have such a relationship as indicated in the user profile, then the contact information can be sent to the requester. If the user profile indicates that the relationship between the requester and contact is not an authorized relationship to receive such information, then the contact information is not sent to the requester. If authorized, the directory application sends the contact information associated with the contact to the requester. The email program application receives the information and can compare the contact information from the directory application with the contact information stored in the address directory. The email program application can replace any differing information with the contact information from the directory application. By maintaining current contact information and authorization information in his or her own profile, a member can control who can receive such contact information.

This introduction is given to introduce the reader to the general subject matter of the application. By no means is the invention limited to such subject matter. Exemplary embodiments are described below.

System Architecture

Various systems in accordance with the present invention may be constructed. FIG. 1 is a diagram illustrating an exemplary system in which embodiments of the present invention can operate. The present invention may operate, and be embodied in, other systems as well.

Referring now to the drawings in which like numerals indicate like elements throughout the several figures, FIG. 1 is a block diagram illustrating a system in accordance with an exemplary embodiment of the present invention. The system 100 shown in FIG. 1 comprises multiple client devices 102a-n in communication with one or more server devices 104, 108 over a network 106. In one embodiment, the network 106 shown comprises the Internet. In other embodiments, other networks, such as an intranet, WAN, LAN, or cellular network may be used. In yet other embodiments, other suitable networks may be used. Moreover, methods according to the present invention may operate within a single computer.

The client devices 102a-n shown each comprises a computer-readable medium, such as a random access memory (RAM) 112 coupled to a processor 110. The processor 110 executes computer-executable program instructions stored in memory 112. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, an optical media, all magnetic tape or other magnetic media, or any other suitable medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any suitable type of processor-based platform that is connected to a network 106 and that interacts with one or more application programs. Client devices 102a-n may operate on any suitable operating system, such as Microsoft® Windows® or Linux. The client devices 102a-n may also support a browser or browser-enabled application program, such as Microsoft Corporation's Internet Explorer™, Netscape Communication Corporation's Netscape Navigator™, and Apple Computer, Inc.'s Safari™. The client devices 102a-n can also include an email program application 114 to allow the users 112a-n to communicate with each other. Examples of email program applications 114 include stand alone email clients such as Microsoft Corporation's Outlook™ or Qualcomm Enterprises' Eudora™, or email program application accessible via a browser program application on a client device 102. Examples of email program application accessible via a browser program application on a client device 102 can include Web page clients such as Microsoft Corporation's Hotmail™ or Google's Gmail™, or an email reader such as AOL™ as well as other email clients as known in the art.

Through the client devices 102a-n, users 112a-n can communicate over the network 106 with each other and with other systems and devices coupled to the network 106. For example, using an email program application 114 on a client device 102a or a web-based email program application on a server device (not shown) accessible via a browser program application on a client device 102a, a user 112a can send a request for the current email address or contact information for a member in a social network. As shown in FIG. 1, server devices 104 and 108 are also coupled to the network 106.

The server device 104 shown comprises a server executing a social network engine application program. Similar to the client devices 102a-n, the saver devices 104 shown comprises a processor 116 coupled to a computer-readable medium, such as a random access memory (RAM) 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of suitable number of computer processors, such as processors from Intel Corporation of Santa Clara, Calif. and Motorola Corporation of Schaumburg, Ill.

Memory 118 contains a social network engine application program, also known as a social network engine 120. The social network engine 120 allows users or members, such as user 112a, to interact with and participate in a social network. A social network can comprise profiles that can be associated with other profiles. Each profile may represent a member and a member can be, for example, a person, an organization, a business, a corporation, a community, a fictitious person, or other entity. Each profile can contain entries, and each entry can comprise information associated with a profile. Other examples of entries for a person profile can comprise information regarding relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines, location information, IM name, phone number, residential address, mailing address, skills, career, or any other information describing, associated with, or otherwise associated with a profile. A profile can contain contact information associated with a member, such as, home telephone number, cell telephone number, home address, personal email address, etc. Similarly, a profile can contain business contact information associated with a members, such as, work telephone number, work address, business email address. A business profile can comprise such information as market sector, customer base, location, supplier information, net profits, net worth, number of employees, stock performance, website, business address, mailing address, telephone number, or other types of information associated with the business profile. Typically a member may also include a representative image(s), audio/video or other multimedia information, etc. Additionally, entries within a profile can comprise associations with other profiles. Associations between profiles within a social network can include, for example, friendships, business relationships, acquaintances, community associations, activity partner associations, common interest associations, common characteristic associations, or any other suitable type of association between profiles. Such associations may be direct (i.e., without intermediary associations) or indirect (i.e., having intermediary associations).

Server device 104 also provides access to storage elements, such as a social network storage element, in the example shown in FIG. 1, a social network database 130. The social network database 130 can store member profiles 132. Data storage elements may include any one or combination of methods for storing data, including it out limitation, arrays, hash tables, lists, and pairs. Other similar types of data storage devices can be accessed by the server device 104. The social network engine 120 can receive data comprising the members profiles from the social network database 130 and can also send data comprising member profiles to the social network database 130 for storage. The social network database 130 may be physically attached or otherwise in communication with the social network engine 120 by way of a network or other connection.

The server device 108 shown can directory server, e.g., a server executing a directory application or protocol 144, e.g., a Lightweight Directory Access Protocol (LDAP). The directory application 144 can respond to requests for the current email address or current contact information sent from the email program application 114 or web-based email program application. Similar to the client devices 102a-n, the server device 108 shown comprises a processor 140 coupled to a computer-readable memory 142. Server device 108, depicted as a single computer system, may be implemented as a network of computer processors. Examples of a server device 108 are servers, mainframe computers, networked computers, a processor-based device, and similar types of systems and devices. Server processor 140 can be any of a number of computer processors, such as processors from Intel Corporation of Santa Clara, Calif. and Motorola corporation of Schaumburg, Ill.

Memory 142 can contain the directory application or protocol 144, e.g., LDAP. The directory application 144 can manage information related to members or users 112a-n within the social network. The directory application 144 can act as a gateway or central repository for information associated with the members or users 112a-n within a social network. In one embodiment, the profiles 132 for each member 112 are stored within the memory 142 of server device 108. In other embodiments, partial profiles or profile information are stored within the memory 142. For example, a member's name and email address; a member's contact information; a member's email address, relationships, and authorization can be stored in the memory 118. In other embodiments, the directory application 144 acts as a gateway to the social network engine 120 and obtains the necessary profile information from the social network database 130 and profiles 132 as needed. As described below, the directory application 144 can respond to lookup requests from the email application 114 or web-based email application With information associated with members 112a-n within the social network, e.g., profile information. In one embodiment, the directory application 144 provides the current email address of a member 112 within the social network to a client device 102 in response to an email address request in another embodiment, the directory application 144 provides the current contact information of a member 112 within the social network to a client device 102 in response to a request for contact information.

It should be noted that the present invention may comprise systems having different architecture than that which is shown in FIG. 1. For example, in some systems according to the present invention, the server devices 104, 108 may comprise a single physical or logical server. In other embodiments, the server devices 104, 108 can be single servers, a virtual server, multiple servers, etc. In yet other embodiments, the functions that are performed by the directory application 144 can be performed by the social network engine 120. The system 100 shown in FIG. 1 is merely exemplary, and is used to help explain the social networks and methods illustrated in FIGS. 2-4.

Exemplary Social Network

Figure 2:
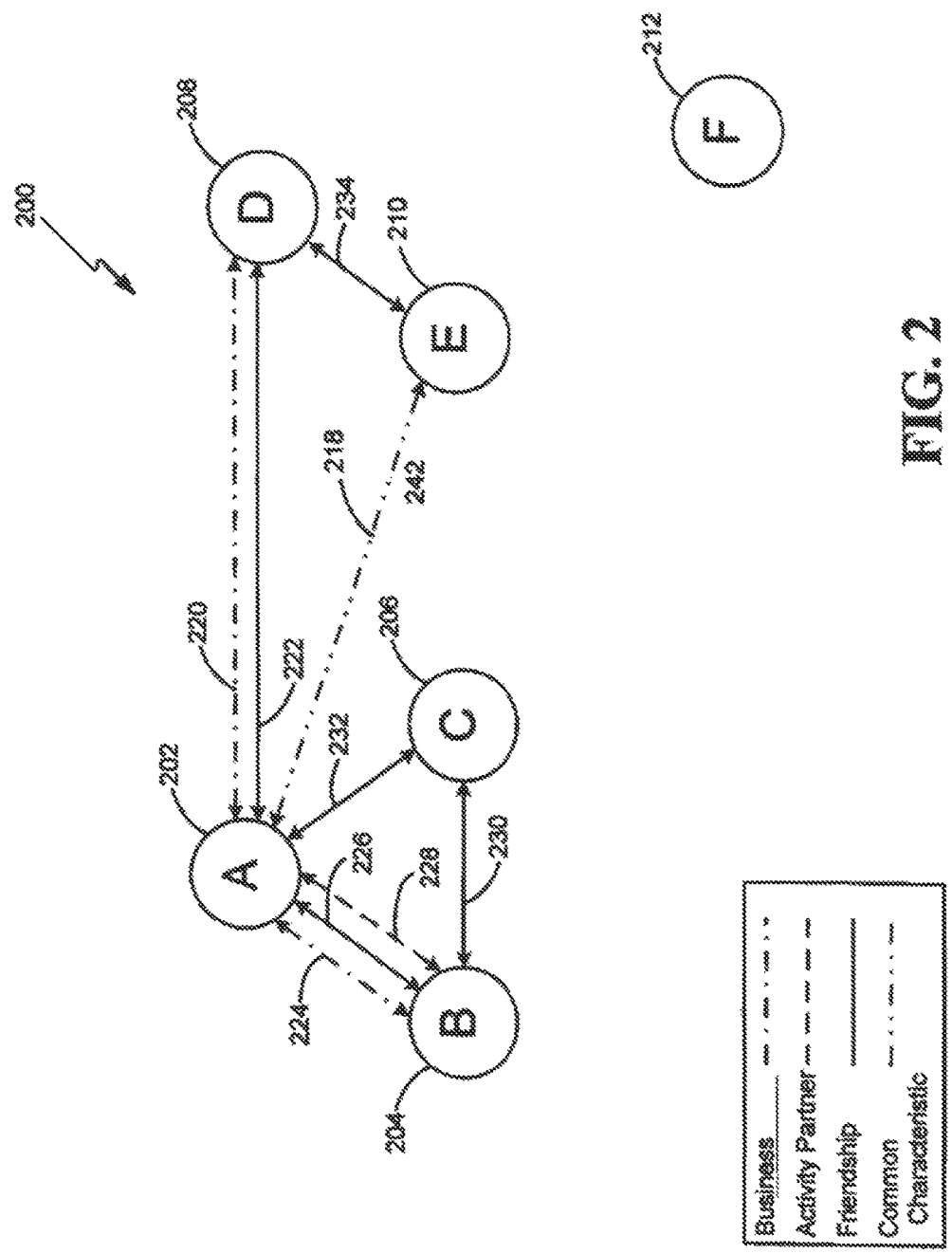
FIG. 2 illustrates one embodiment of a social network in accordance with an exemplary embodiment of the present invention.

FIG. 2 illustrates an exemplary embodiment of a social network 200. According to the embodiment illustrated in FIG. 2, the social network 200 comprises a graph comprising vertices 202-212 and edges 218-234. The vertices 202-212 comprise profiles A-F. Each profile can represent a member. The edges 218-234 comprise associations between profiles. According to the embodiment shown in FIG. 2, the social network 200 comprises a plurality of differing types of associations represented by edges 218-234. The types of associations listed in FIG. 2 for illustration purposes are business associations, activity partner associations, friendship associations, community associations, and common characteristic associations. Common characteristic associations can include associations based on some characteristic such as attending the same high school or being from the same hometown, but can indicate a lower level of significance that another type of association, such as a friendship association. In one embodiment, the social network 200 comprises a single associations, such as a friendship association. One or more associations can have different levels. For example, a friendship association can have the following levels: haven't met, acquaintance, friend, good friend, and best friend.

For example, edge 220 and edge 222 each comprise an association between profile A at vertex 202 and Profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A-F comprising the vertices 202-212, for purposes of illustration is a person. Other types of members can be in social network 200. The associations 218-234 illustrated in FIG. 2 comprise bi-directional associations. The associations are bi-directional because when one profile, for example profile A, is associated with another profile, for example profile D, then profile D is also associated with profile A. In one embodiment, A and D will not be associated with each other until both profiles consent to such association; e.g., A may invite D to be associated therewith, and the association occurs upon D's acceptance of such invitation. The invitation, for example, may include sending an email or other message to D indicating that A has requested an association with D.

Other embodiments of the present invention may comprise directed associations or other types of associations. Directed associations associate a first profile with a second profile while not requiring the second profile to be associated with the first profile. For example, in a directed chart, profile A can be associated by a friendship association with profile B, and profile B can be unassociated by a friendship connection with profile A. Thus a display of profile A's friends would include profile B, but a display of profile B's friends would not include profile A.

Within a social network, a degree of separation can be determined for associated profiles. One method of determining a degree of separation is to determine the fewest number of edges of a certain type separating the associated profiles. This method of determining a degree of separation can produce a type-specific degree of separation. A type-specific degree of separation is a degree of separation determined based on one particular type of association. For example, a profile A has a friend association degree of separation of two from profile E. The fewest number of friendship associations between profile A and profile F is two—the friendship association comprising edge 220 and the friendship association comprising edge 234. Thus, for the associated profiles A and E, the degree of friendship separation, determined according to one aspect of one embodiment of the present invention is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation according to the embodiment depicted in FIG. 2, is one. The common characteristic in this example, can be that profile A attended the same high school as profile E. A common characteristic association may be selected by profiles A and E to represent that they are associated in some fashion, but to not create a close association such as with a friendship association.

According to other aspects of certain embodiments of the present invention, the degree of separation may be determined by use of a weighting factor assigned to each association. For example, "best" friends can be weighted higher than "haven't met" friends. According to certain aspects of embodiments using a weighting factor, a higher weight factor for an association can reduce the degree of separation between profiles and lowering weighting factors can increase the degree of separation. This can be accomplished, for example, by establishing an inverse relationship between each associations and a corresponding weighting factor prior to summing the associations. Thus, highly weighted associations would contribute less to the resulting sum than lower weighted associations.

Process

Various methods in accordance with the present invention may be constructed. For example, in one embodiment, the method begins with receiving a request for an email address for a first member in a social network. The request comprises an entity identifier associated with the first member. After receiving the request, the entity identifier is parsed from the request and the corresponding email address is obtained using profile information associated with the entity identifier. The email address is than sent to the requester where the email address is entered into the send-to parameter of an email message.

In another embodiment, the method begins with receiving a request for contact information associated with a first member in a social network. The request comprises an entity identifier associated with the first member, e.g., a contact. After receiving the request, the relationship between the contact and the sender of the request, e.g. a requester, is determined using profile information associated with the contact and a determination is made whether the relationship between the contact and the requester is an authorized relationship. If the requester is authorized to receive the contact information, then the contact information is sent to the requester. The sent contact information is then compared with the contact information for the contact stored in the requester's address book. If the information differs, then the differing contact information in the address book is replaced with the sent contact information.

Figure 3:
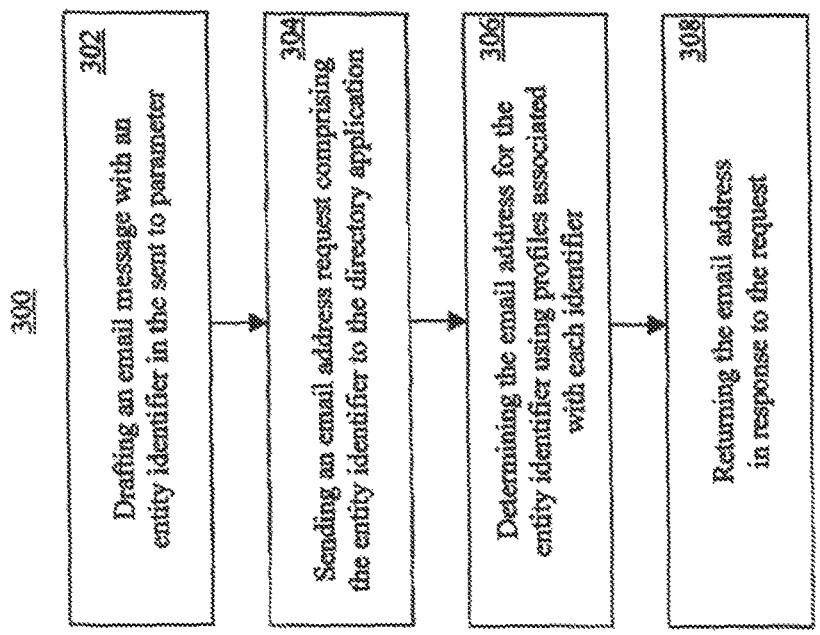
FIG. 3 illustrates a now diagram of a method in accordance with an exemplary embodiment of the present invention.

FIG. 3 illustrates an exemplary method 300 that provides the current email address for a member 112 within a social network, in accordance with an embodiment of the present invention. This exemplary method is provided by way of example, as there are a variety of ways to carry out methods according to the present invention. The method 300 shown in FIG. 3 can be executed or otherwise performed by one or a combination of various systems. The method 300 is described below as carried out by the system 100 shown in FIG. 1 by way of example, and various elements of the system 100 are referenced in explaining the example method of FIG. 3.

The method 300 begins in block 302 when a user enters an entity identifier associated with a member of a social network into a sending parameter of an email message. For example, using an email program application 114 on a client device 102a or a web-based email program application accessible via a browser program application on a client device 102a, a user 112a types in a name of an entity identifier, e.g., an intended recipient of an email message, into "to" or "send-to" parameter of an email message. The entity identifier can take various forms depending on the email program application, with each entity identifier attempting to identify an intended recipient of the email message. For example, each entity identifier can be a name, first and last name, nickname, partial name, a first initial with the last name, an entity, an email address, an emailing group name, a group name, etc.

At block 304, an email address request comprising the at least one entity identifier is sent to the directory application 144. For example, the email program application (client or web-based) sends the email address request to the directory application 144 in response to a triggering event. Examples of triggering events can be using a send button, using function or function short keys to cause the triggering, e.g., simultaneously hitting the control key and "k" key in Microsoft Outlook™, clicking out of or exiting from the send-to parameter field, expiration of time, or other known triggers as known in the art. The email address request can also include an entity identifier associated with the requester 112a who causes the email address request to be sent.

Depending on the configuration of the email program application, the email program application can access one or more name exchange servers or directories, e.g., a local name exchange server, prior to causing the email address request being sent to the directory application 144. For example, the email program application can automatically replace the entity identifier with the name (typically, last name, first name) of each intended recipient associated with the entity identifier or can provide a list of potential recipients to the user who can select the intended recipient. In one embodiment, if the entity identifier is a group email name, the email program application can replace the entity identifier with an entity identifier for each user in the group email name.

Returning to FIG. 3, after receiving the email address request, the method 300 proceeds to block 306, wherein the email address for the entity identifier is identified. The directory application 144 parses the entity identifier from the email message to identify the intended recipient of the email message. The directory application 144 obtains the email address from the profile information associated with the entity identifier, e.g., a member of a social network. If more than one member is associated with an entity identifier, then the directory application 144 can provide a list of email addresses to the email program application which can prompt the requester to identify the intended recipient. For example, if the entity identifier was "Smith", then the directory application 144 generates and provides a list of names containing "Smith" to the requester prompting a selection of the appropriate Smith.

Similarly, if more than one email address is associated with an entity identifier, then the directory application 144 can cause a prompt to be sent to the requester to select an email address associated with the entity identifier. Alternatively, if more than one email address is associated with an entity identifier, then the appropriate email address can be selected based on the relationship between the intended recipient and the sender of the email address request. For example, if the profile associated with the intended recipient of an email message indicates that the sender of the email address request is a friend of the intended recipient, then the private email address of the intended recipient can be provided. Similarly, if the profile indicates that the sender of the email address request is a business acquaintance of the intended recipient of the email message, then a business email address of the intended recipient can be provided. In instances, where the profile indicates that the intended recipient and the sender of the email address request have multiple relationships, then the sender of the email address request can be provided with a list of the appropriate email addresses associated with the intended recipient. Then the directory application 144 prompt the sender of the email address request to select one or more of the email addresses.

Since the directory application 144 does not need a member's entire profile, the server device 108 does not have to store entire profiles in memory 142 or obtain entire profiles 132 from the social network database 130. In one embodiment, the profile information stored in the memory 142 on the server device 108 can be limited. For example, the profile information in the memory 142 can include the member's name and email address for each member. In one embodiment, the directory application 144 accesses the social network database for all requested profile information. Regardless of how much profile information is stored in the memory 142, the profile information should match with the profile information stored in the social network database 130. Since a member of the social network can update his or her profile at any time, the member controls whether his or her email address is current.

Returning to FIG. 3, after identifying the email address for the intended recipient of the email message, the method 300 proceeds to block 308, wherein the email address for the intended recipient is returned or outputted to the sender of the email address request. For example, the directory application 144 sends the email address to the email program application that caused the email address request to be sent. Since each member 112 can update his or her own profile within the social network, the method 300 allows members to control whether the email address listed in his or her profile is current. As a result, email messages can be sent to the most current email address for members 112a-n in the social network. Hence, an administrator is not required to update a person's email address on a name exchange server as required in most email client systems.

Figure 4:
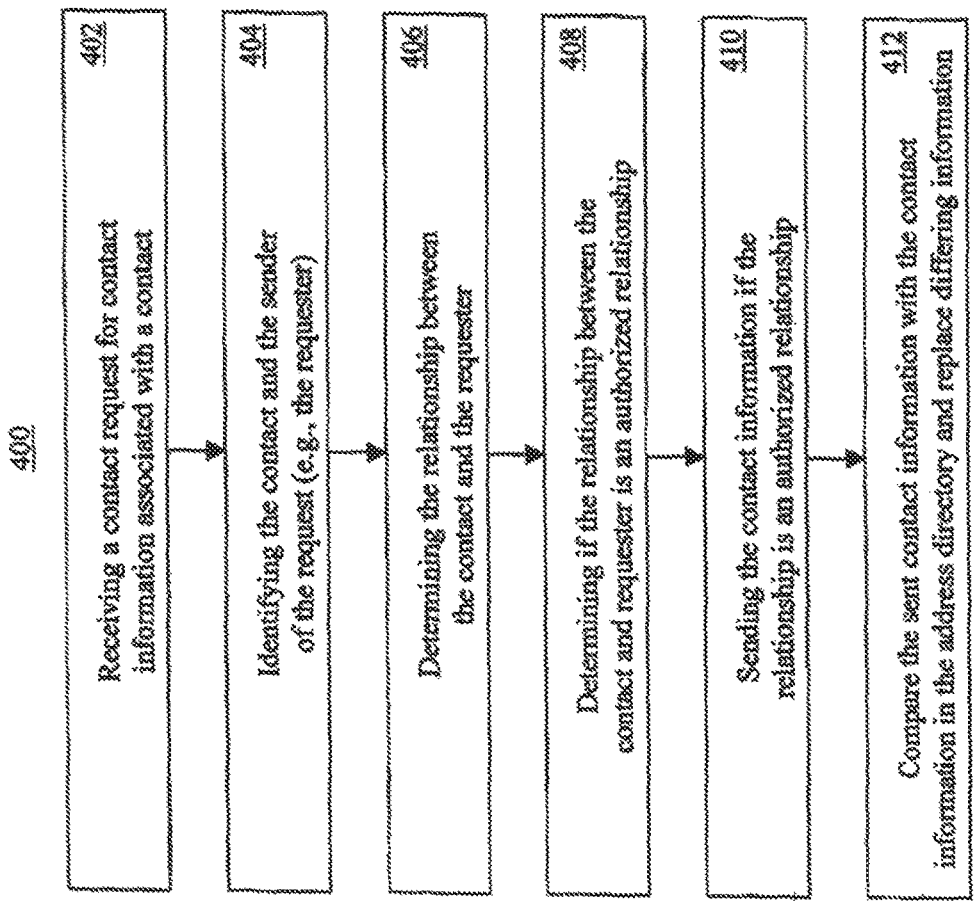
FIG. 4 illustrates another flow diagram of a method in accordance with an exemplary embodiment of the present invention.

FIG. 4 illustrates an exemplary method 400 that provides current contact information for a member within a social network, in accordance with one embodiment of the invention. This exemplary method is provided by way of example, as there are a variety of ways to carry out methods according to the present invention. The method 400 shown in FIG. 4 can be executed or otherwise performed by one or a combination of various systems. The method 400 is described below as carried out by the system 100 shown in FIG. 1 by way of example, and various elements of the system 100 are referenced in explaining to example method of FIG. 4.

The method 400 illustrated in FIG. 4 begins in block 402 with receiving a request for contact information (a contact request) associated with a member of a social network, e.g., a user 112. For example, an email application 114 on a client device 102 or a web-based email application accessible via a browser program application on a client device 102 can send the contact request to the directory application 144 in response to a triggering event. The contact request can contain a first entity identifier identifying the sender of the request and a second entity identifier identifying the contact whose contact information is being requested. The entity identifier can be a name, first and last name, nickname, partial name, a first initial with the last name, an entity; an email address, an emailing group name, etc. The triggering event can be an email address request as described above with respect to FIG. 3, using a send button, using function or function short keys to cause the triggering, e.g., simultaneously hitting the control key and "k" key in Microsoft Outlook™, clicking out of or exiting from the send-to parameter field, replying to an email message, expiration of time, periodically, clicking on or accessing a contact name in an address directory, or other known triggers as known in the art.

After receiving the contact request, the method 400 proceeds to block 404, wherein the requester and contact are identified. For example the directory application 144 parses the entity identifiers from the request to identify the requester and contact. If more than one contact are associated with an entity identifier then the directory application 144 can cause the requester to be prompted to identify the contact as discussed above with respect to method 300.

After identifying the requester and contact, the method 400 proceeds to block 406, wherein the relationship between the requester and contact is determined. To determine the relationship between the requester and the contact, the directory application 144 uses the profile information associated with the contact to determine what relationships, if any, exist between the contact and requester, e.g., whether the user profile lists any relationship between the requester and contact. Exemplary relationships can include none, friends, friends of friends, business associations, and other relationships known in the art. Relationships can also have varying levels, such as, for example, haven't met, acquaintance, friend, good friend, and best friend.

After determining the relationship between the requester and contact, the method proceeds to block 408, wherein a determination is made as to whether the identified relationship is authorized to receive the contact information and the type of contact information that can be received. For example, using the profile information, the directory application 144 determines the type of relationships that are authorized to receive contact information associated with the contact, such as friends, friends of friends, or all. An authorized relationship can also be used on an email address domain name, e.g., "@google.com", where the contact request is granted based on an approved domain name. Similarly, a member of the social network can designate the type of contact information he or she is willing to provide to others. This designation can be part of the profile associated with the member. For example, a member can designate that only friends can receive the member's cell phone number and only business acquaintances can receive the member's business telephone number.

Since the directory application 144 does not need a member's entire profile, the server device 108 does not have to store entire profiles in memory 142 or obtain entire profiles from the social network database 130. In one embodiment, the memory 142 on the server device 108 can be limited, e.g., profile information which can include the member's relationship, authorization and contact information. In one embodiment, the directory application 144 accesses the social network database for all requested profile information. Regardless of how much profile information is stored in memory 142, the profile information should match with the profile information stored in the social network database 130. Since a member of the social network can update his or her profile at any time, a member can ensure that his or her contact information is current.

Returning to FIG. 4, after determining if the requester is authorized to receive the contact information, the method 400 proceeds to block 410, wherein the contact information is sent or outputted when the requester is authorized to receive such information. For example, the directory application 144 sends the contact information associated with the contact to the email program application which caused the contact request to be sent. The contact information that is sent can be limited to the information that the contact authorizes, e.g., the member's cell telephone number to friends and the member's business telephone number to business acquaintances. If the requester is not authorized to receive such information, then no information is sent or a message indicating that the requester is not authorized to receive such information is sent.

After sending or outputting the contact information, the method 400 proceeds to block 412 where the contact information from the directory application 144, e.g., the sent contact information, is compared with the contact information in the address book, e.g., an electronic address book, with differing information being replaced with the contact information from the directory application 144. For example, the email program application receives the contact information from the directory application 144 and compares the two sets of contact information. The email program application can replace the differing contact information in the address book with the corresponding contact information from the directory application 144. In one embodiment, the replacement of the differing information is automatic. In another embodiment, the requester can be prompted to replace the differing contact information.

Thus, a member can help to maintain his or her contact information in other member's address books without having the other members physically enter the changes. If a member is in the process of changing jobs, the member can change the contact information in his or her profile and provide the updated information when someone sends a contact request. In addition, a member can determine which members can receive his or her contact information, as well as the specific contact information that can be provided, based on one or more authorization parameters within his or her profile.

Although the exemplary methods 300, 400 are described with the intended recipient of the email message and the contact, being members of a social network, the sender of the email address request and/or the sender of the contact request can be members of the same social network or can be members of a different social network than the intended recipient and/or contact. In another embodiment, the sender of the email address request and/or the sender of the contact request do not have to belong to any social networks. The exemplary methods 300, 400 are described with requests with single entity identifiers, however the requests can contain multiple entity identifiers for obtaining information for multiple members.

GENERAL

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A method comprising:
   receiving a request for an email address of a first member of a social network from a second member of the social network responsive to detecting an input of a first identifier associated with the first member in a sending parameter of an email message;
   determining, using a processor, a type of relationship and a level of relationship of the second member with the first member;
   determining a degree of separation between the second member and the first member based on a weighting factor associated with the type of relationship and the level of relationship;
   determining, using the processor, whether the second member is authorized to receive the email address based on the type of relationship, the level of relationship, and the degree of separation;
   determining the email address from a social network profile of the first member; and
   responsive to the request and the second member being authorized to receive the email address, transmitting the email address.

2. The method of claim 1, wherein receiving the request for the email address of the first member of the social network is further responsive to detecting a triggering event including using a send button to send the email message.

3. The method of claim 1, wherein the request is received from a web-based email program accessible via a browser program application on a client device, the web-based email program configured to send the email message.

4. The method of claim 1, further comprising:
   determining whether the first identifier identifies multiple members of the social network; and
   in response to the first identifier identifying multiple members, sending an identification request to the second member to select the first member from among the multiple members.

5. The method of claim 1, further comprising:
   determining whether the second member is authorized to receive a second email address of the first member based on the type of relationship, the level of relationship, and the degree of separation of the second member with the first member in the social network;
   determining the second email address from the social network profile of the first member; and
   responsive to the second member being authorized to receive the second email address, transmitting the second email address.

6. The method of claim 1, wherein determining the degree of separation between the first member and the second member uses a second identifier associated with the second member and the first identifier.

7. The method of claim 1, further comprising:
   determining whether the email address differs from a second email address in an electronic address book associated with the second member; and
   replacing the second email address with the email address in response to determining that the email address differs from the second email address in the electronic address book.

8. A system comprising:
   a computer processor; and
   a non-transitory computer readable medium storing instructions that, when executed by the computer processor, are configured to:
   receive a request for an email address of a first member of a social network from a second member of the social network responsive to detecting an input of a first identifier associated with the first member in a sending parameter of an email message;
   determine a type of relationship and a level of relationship of the second member with the first member;
   determine a degree of separation between the second member and the first member based on a weighting factor associated with the type of relationship and the level of relationship;
   determine whether the second member is authorized to receive the email address based on the type of relationship, the level of relationship, and the degree of separation;
   determine the email address from a social network profile of the first member; and
   responsive to the request and the second member being authorized to receive the email address, transmit the email address.

9. The system of claim 8, wherein the instructions that, when executed by the processor, are further configured to receive the request for the email address of the first member of the social network responsive to detecting a triggering event including using a send button to send the email message.

10. The system of claim 8, wherein the request is received from a web-based email program accessible via a browser program application on a client device, the web-based email program configured to send the email message.

11. The system of claim 8, wherein the instructions that, when executed by the processor, are further configured to:
    determine whether the first identifier identifies multiple members of the social network; and
    in response to the first identifier identifying multiple members, send an identification request to the second member to select the first member from among the multiple members.

12. The system of claim 8, wherein the instructions that, when executed by the processor, are further configured to:
    determine whether the second member is authorized to receive a second email address of the first member based on the type of relationship, the level of relationship, and the degree of separation of the second member with the first member in the social network;
    determine the second email address from the social network profile of the first member; and
    responsive to the second member being authorized to receive the second email address, transmit the second email address.

13. The system of claim 8, wherein the instructions that, when executed by the processor, are further configured to determine the degree of separation between the first member and the second member using a second identifier associated with the second member and the first identifier.

14. The system of claim 8, wherein the instructions that, when executed by the processor, are further configured to:
   determine whether the email address differs from a second email address in an electronic address book associated with the second member; and
   replace the second email address with the email address in response to determining that the email address differs from the second email address in the electronic address book.

15. A computer program product comprising a non-transitory computer readable medium encoding instructions that, in response to execution by a computing device, cause the computing device to perform operations comprising:
   receiving a request for an email address of a first member of a social network from a second member of the social network responsive to detecting an input of a first identifier associated with the first member in a sending parameter of an email message;
   determining a type of relationship and a level of relationship of the second member with the first member;
   determining a degree of separation between the second member and the first member based on a weighting factor associated with the type of relationship and the level of relationship;
   determining whether the second member is authorized to receive the email address based on the type of relationship, the level of relationship, and the degree of separation of the second member with the first member in the social network;
   determining the email address from a social network profile of the first member; and
   responsive to the request and the second member being authorized to receive the email address, transmitting the email address.

16. The computer program product of claim 15, wherein the operations further comprise receiving the request for the email address of the first member of the social network responsive to detecting a triggering event including using a send button to send the email message.

17. The computer program product of claim 15, wherein the request is received from a web-based email program accessible via a browser program application on a client device, the web-based email program configured to send the email message.

18. The computer program product of claim 15, wherein the operations further comprise:
   determining whether the first identifier identifies multiple members of the social network; and
   in response to the first identifier identifying multiple members, sending an identification request to the second member to select the first member from among the multiple members.

19. The computer program product of claim 15, wherein the operations further comprise:
   determining whether the second member is authorized to receive a second email address of the first member based on the type of relationship, the level of relationship, and the degree of separation of the second member with the first member in the social network;
   determining the second email address from the social network profile of the first member; and
   responsive to the second member being authorized to receive the second email address, transmitting the second email address.

20. The computer program product of claim 15, wherein determining the type of relationship of the second member with the first member includes determining the degree of separation between the first member and the second member uses a second identifier associated with the second member and the first identifier.

* * * * *